United States Patent Office 3,440,610
Patented Apr. 22, 1969

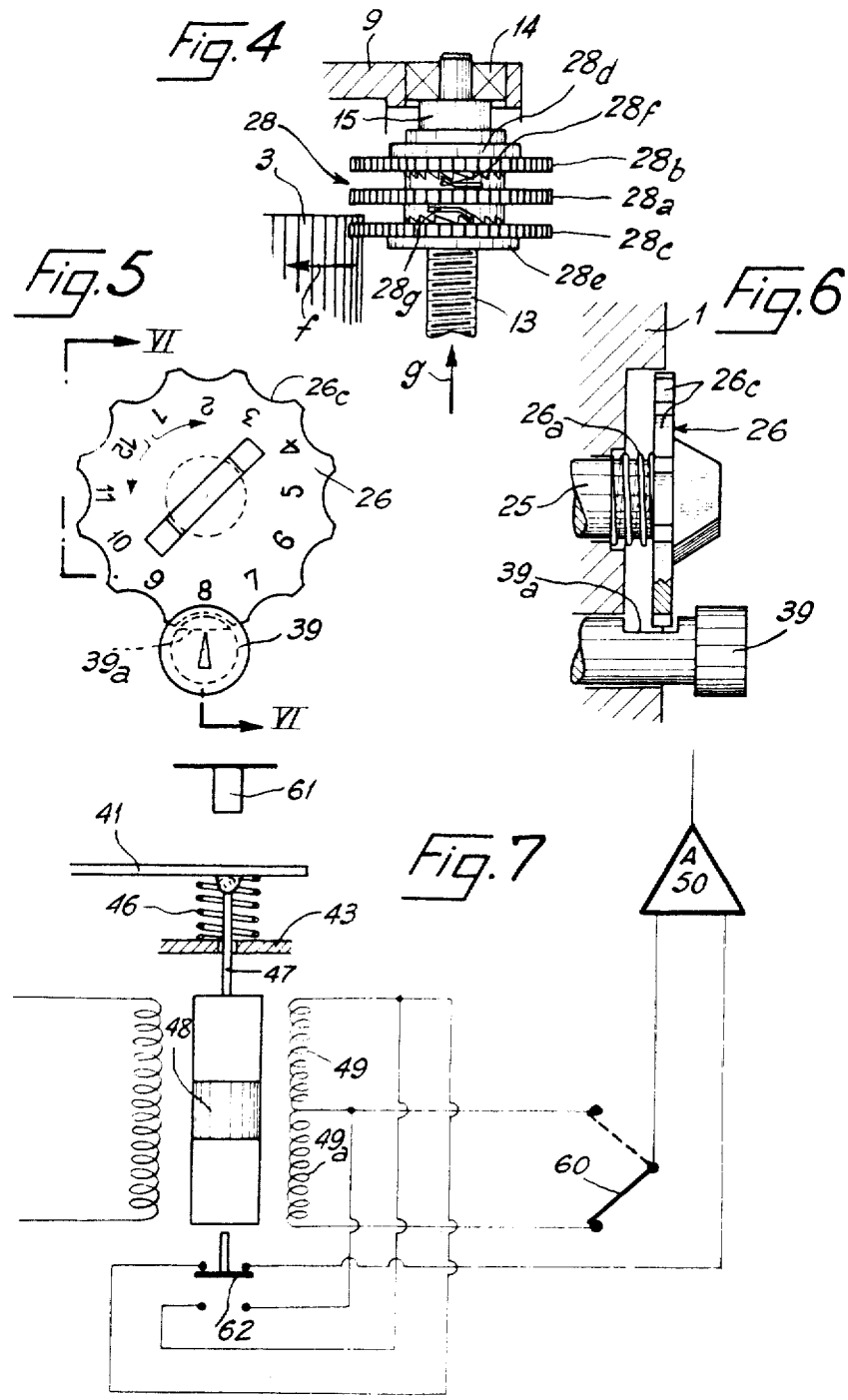

3,440,610
APPARATUS FOR STORING INFORMATION ELEMENTS
Jean Pierrat, Versailles, Yvelines, France, assignor to Société Anonyme des Ateliers d'Aviation Louis Breguet, Paris, France, a corporation of France
Filed Dec. 17, 1965, Ser. No. 514,576
Claims priority, application France, Dec. 22, 1964, 999,614
Int. Cl. G11b *13/00*
U.S. Cl. 340—172.5   12 Claims

ABSTRACT OF THE DISCLOSURE

The invention relates to an apparatus for storing arbitrarily selected instantaneous data elements such as the coordinates of the projection of a silhouette on a screen by recording the geometric positions of nuts relative to worms with the possibility of recalling the information at any time by restoring the nuts in the places corresponding to the positions occupied at the time of write-in.

In my prior U.S. Patent #3,329,062, granted July 4, 1967, there is disclosed an illuminated information table for automatically and simultaneously displaying a number of data elements which are either permanent or variable in time. One such data element which the table can display is the position of a moving object, such as an aircraft, in which the table is installed, the position being indicated by the projection on the table screen of a moving silhouette located by its coordinates referred to north-south and east-west axes passing through the centre of the screen. The coordinates are supplied continuously by the aircraft route computer and are represented continuously, for instance, in the form of the voltages at two potentiometer sliders.

The invention relates to an apparatus for storing information elements.

The present invention relates to a method of and apparatus for storing arbitrarily selected instantaneous data elements and more particularly, aircraft positions—i.e., recording the positions with the possibility of recalling the information at any time—i.e., of displaying the silhouette a second time on the screen in the place corresponding to the position occupied at the time of write-in. Of course, the method and apparatus according to the invention are not limited just to the particular cases outlined and are also of use for storing any data element which varies in time.

According to the invention, the geometric position of a nut relative to a worm is used to represent or translate the value of the written-in data element to be stored, means being provided to bring the nut to the required geometric position—i.e., to write-in the data—and to locate the position of the nut—i.e., to read-out the stored data. In the particular case in which the invention is used for an illuminated data table in which the data to be stored comprises two elements which are the coordinates of a point, the apparatus according to the invention comprises two twin units associated one each with a coordinate. Advantageously, the apparatus and, where applicable, each unit thereof comprises a number of nut and worm devices to enable a corresponding number of different data elements to be stored. For the use more particularly envisaged in the foregoing, means are preferably provided to transmit coordinate changes at the centre of the table to the nut and worm devices, to which end each unit of the apparatus comprises a central pinion with which the various nuts mesh by way of appropriate tooth sets, the pinion being controlled from the coordinates computer of the table and being adapted to rotate the nuts, for the transmission just referred to, and also to lock the nuts in rotation between coordinate changes.

The invention is illustrated by way of example in the accompanying drawings in which:

FIG. 4 is a detailed view to an enlarged scale showing how a nut can be constructed;

FIGS. 5 and 6 are views, one in front elevation and the other on the line VI—VI of FIG. 5, showing details of how the control knobs of the apparatus are devised, and FIG. 7 is a circuit diagram of the electromagnetic pick-off controlled by the feeler determining the position of the nuts.

Figure 1:
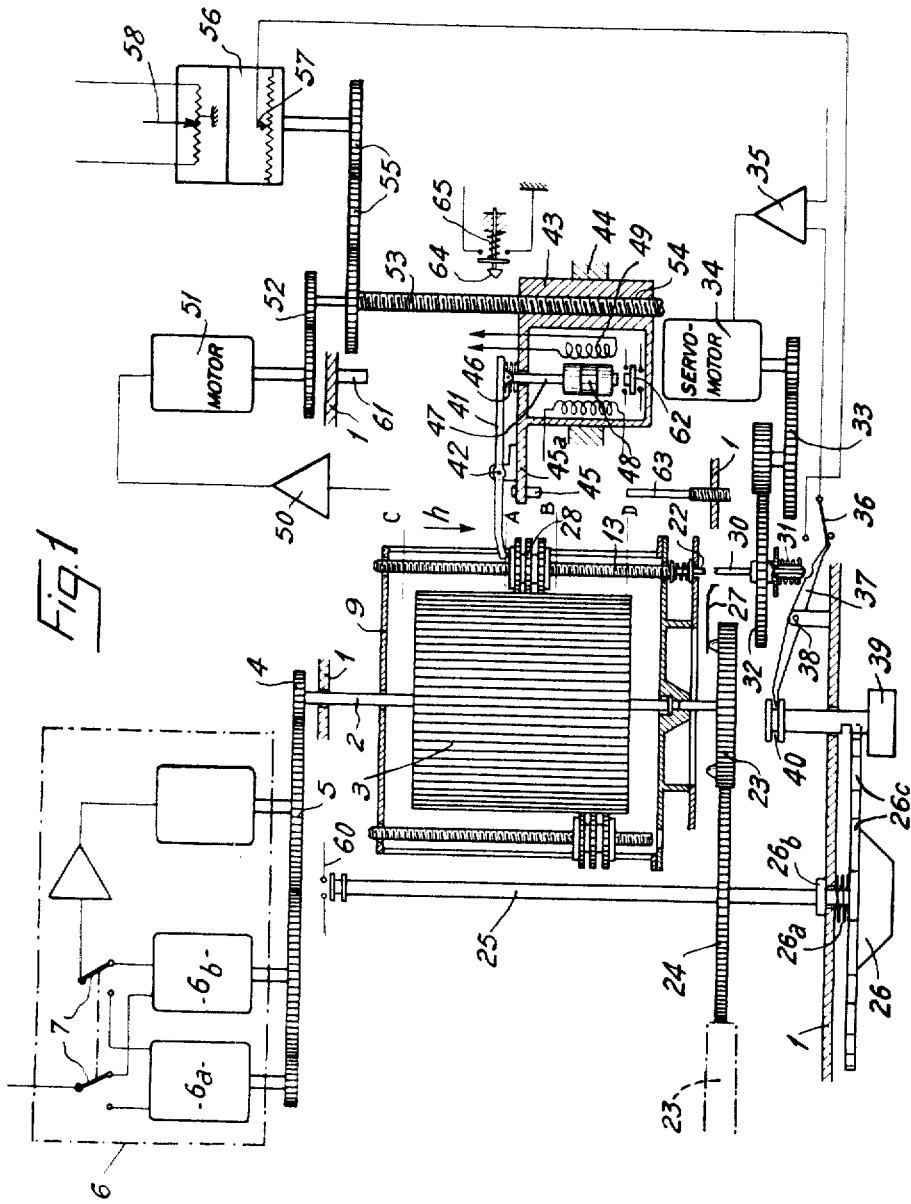
FIG. 1 is a diagrammatic plan view of a write-in device associated with an information table of the kind disclosed by the aforesaid patent specification (for the sake of clarity in the drawing, only common elements and the elements associated with one of the coordinates of the points to be stored are shown)
Figure 2:
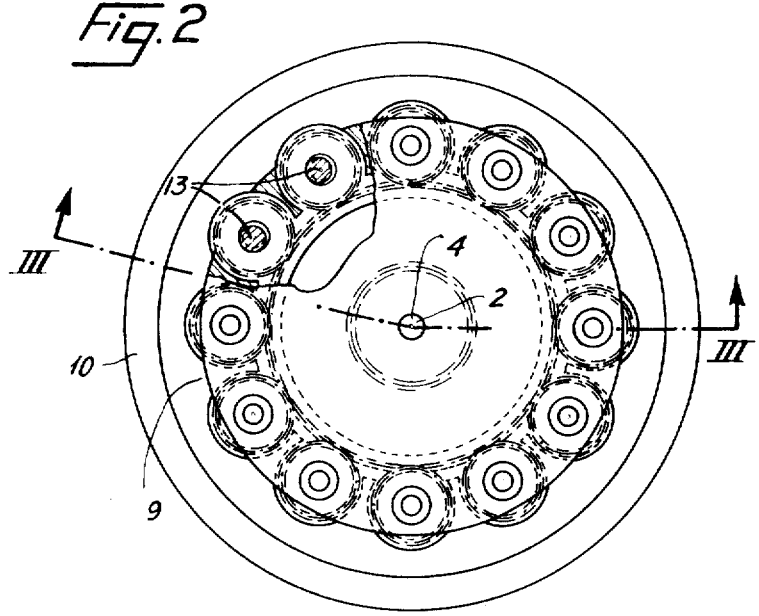
FIG. 2 is a rear view, with some parts removed, of one of the drums which bear the nut and screw devices.

In the embodiment shown in the drawings, the write-in device is intended for use with an illuminated information table of the kind disclosed by the aforesaid patent specification wherein the table on which the aircraft silhouette denoting aircraft position is located by its cartesian coordinates in a system in which a north-south axis and east-west axis pass through the centre of the table. The coordinates are represented continuously by voltages at sliders of two potentiometers which will be called the north-south or N.S. potentiometer and the east-west or E.W. potentiometer. Coordinate changes can be made on the table to return the silhouette to the centre of the table when the silhouette is likely to leave the screen because of the aircraft's progress. The table comprises a coordinates counter which records coordinate changes at the centre of the table and which is connected to the apparatus according to the invention by a synchro-transmitter. These items of the table serve as a data source for the apparatus according to the invention and are not shown. Since in the present example the data to be written in comprises two elements which are the two coordinates of a point, the apparatus according to the invention comprises two identical units each associated with one of the two coordinates, and only one of the units will be described in detail.

Referring to FIG. 1, the apparatus according to the invention comprises a combined box and frame 1; a shaft 2 to which a wide pinion 3 having longitudinal teeth is rigidly secured is disposed, to the number of one for each coordinate, in the casing 1. A pinion 4 rigidly connected to the end of the shaft 2 meshes with an output gear wheel 5 of a synchro detector 6 connected, as already stated, to the table coordinates counter. The synchro detector 6 is double and comprises elements 6*a*, 6*b* associated with a selector switch 7 corresponding to two scales, e.g., 1/30,000 and 1/120,000, used on the table.

Figure 3:
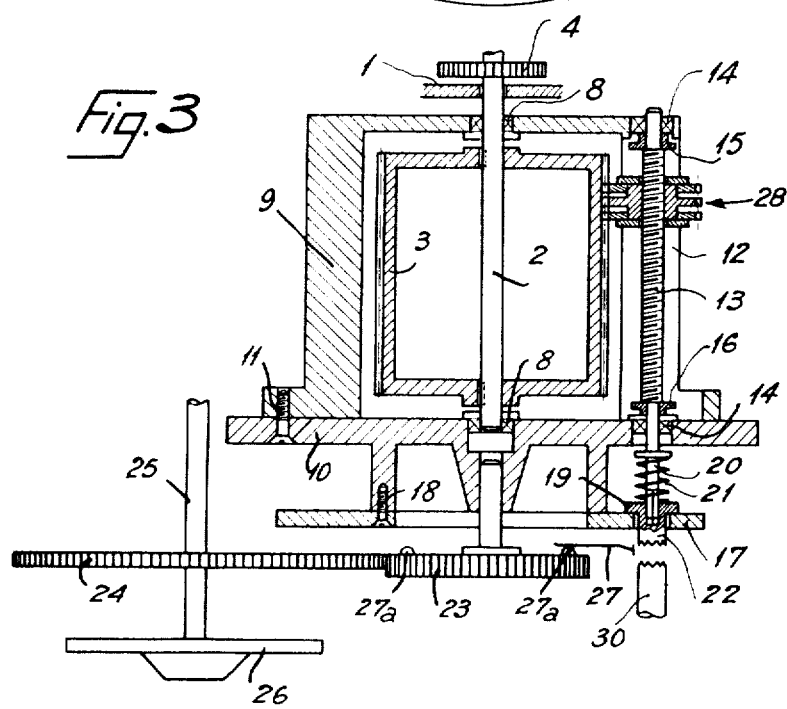
FIG. 3 is a section on the line III—III of FIG 2.

Referring now to FIG. 3, a drum 9 and its cover 10 which enclose the pinion 3 are rotatably mounted on the shaft 2 with the interposition of antifriction bearings 8. The drum 9 and cover 10 are rigidly interconnected by screws 11; the drum 9 is formed with longitudinal slots 12 receiving worms 13 rotating in antifriction bearings 14 between end stops 15 and 16. The cover 10 comprises an annular disc 17 secured by screws 18.

A brake 19 acting on the end 20 of the worm 13 is provided for each worm, is disposed between the cover and the disc 17, is maintained in the operative position by a spring 21 and comprises a clutch element 22. A gear wheel 23 is rigidly connected to the cover 10 coaxially of the shaft 2 and meshes with a wheel 24 rigidly secured to a shaft 25 terminating in a control knob or store selector 26 urged outwards by a spring 26a associated with an abutment 26b.

The wheel 24 acts simultaneously on the two wheels 23 of the mechanisms associated with the two coordinates and therefore enables the drums 9 to be rotated simultaneously with their covers 10 and their accessories. In the present example, this rotation is effected in 30° steps, 12 equidistant worms being provided on each drum. A click stop device or the like 27 co-operating with studs 27a is, for instance, associated with each wheel 23 for correct angular location of the drum and its accessories.

A nut 28, details of which are shown in FIG. 4, is engaged on each worm 13, and has three identical sets of teeth which normally mesh with the pinion 3. The central tooth system 28a rotates solidly with the nut hub and the two outer tooth systems 28b, 28c are freely rotatable on the nut hub and are retained by end plates 28d, 28e. Pawl and ratchet mechanisms 28f, 28g operative to opposite hands are, as FIG. 4 shows, interposed between the nut hub and the outer tooth systems. The distance axially of the shaft 2 between, on the one hand, each edge of the pinion 3 and, on the other hand, the adjacent abutment 15 or 16 is such that two of the tooth systems of the nuts can disengage from the pinion 3 when the nut reaches either of its end positions. Consequently, the ratchet mechanisms enable the nuts to move to their end positions without rotating the pinion 3 relatively to the drum 9. Assuming, for instance, that the worm 13 is stationary and the nut 3 is rotating in the direction indicated by an arrow f in FIG. 4, then, while the central tooth system 28a is in engagement with the pinion 3, the nut moves along the worm in the direction indicated by an arrow g. When the tooth system 28a disengages from the pinion 3, the nut is stopped by the abutment 15 and only the tooth system 28c stays in mesh with the pinion. The "handing" of the ratchet mechanism 28g is such that the pinion 3 drives the tooth system 28c but not the rest of the nut, which can therefore continue to rotate without impediment. Upon a reversal of the direction of pinion rotation, the ratchet mechanism 28g comes into operation and drives the nut, the same then moving along the worm in the opposite direction to the arrow g. Operation is the same at the other end of the worm, the operative elements being in this case the tooth system 28b and the ratchet mechanism 28f.

Since the worms 13 are braked, rotation of the pinion 3 relatively to the drum 9 moves all the nuts together in the same direction, in dependence upon coordinates changes of the table. To leave a good latitude for coordinates changes, movement of the nuts along the whole length of their respective worms corresponds to several times, for instance, 4 times, the length of the table side. In FIG. 1, the length of the table side corresponds to the distance between the lines A and B, the total distance or travel being represented by the lines C and D.

Associated with each of the drums just described is a write-in device comprising a clutch element 30 engageable with the clutch element 22 of the worm opposite it. The clutch element 30 is urged into the disengaged position by a spring 31 and rotates solidly with a gear wheel 32 which a reducer 33 connects to a servo motor 34 connected via an amplifier 35 to the slider of either the north-south or east-west potentiometer, depending upon the coordinate which it is required to represent by nut position. A lever 37 pivotally connected to the casing 1 by a pivot 38 is adapted to urge the clutch element 30 into engagement with the clutch element 22. A pull knob 39 or write-in knob connected to the lever 37 by way of a pulley 40 is adapted to operate the lever 37 simultaneously with a normally open switch 36 whose purpose will be described hereinafter. As FIGS. 1, 5 and 6 show, the knob 39, which is common to both parts of the write-in system, is so associated with the store selector 26 as to be operable only when the store selector 26 is in a position such that one of the clutch elements 22 is disposed opposite the clutch element 30. To this end, the store selector 26 comprises a collar formed with notches 26c (one per worm 13) in which the rod associated with the knob 39 can slide, and the knob 39 is formed with a groove 39a enabling that selector to be rotated whose collar engages in the groove 39a. Consequently, in the absence of any notch 26c opposite the knob rod, the knob is locked.

When the knob 39 is pulled, the switch 36 closes and the worm 13 opposite the clutch element 30 is coupled therewith, the brake 19 being released. A signal from the (N.S. or E.W.) potentiometer of the general control then starts the motor 34 alloted to each coordinate. The worm 13 rotates and the nut 28, being preventing from rotating by the pinion 3, moves along the worm 13.

Each unit of the write-in apparatus comprises a controlled electromagnetic feeler system for determining the geometric position on the worm of the nut disposed opposite the clutch element 30. The feeler mechanism comprises a feeler lever 41 pivotally mounted by way of a pivot 42 on a casing 43 slidable without rotation in guides 44. One end of the lever 41 can move in that groove 12 of the drum 9 which is opposite such end on the path of the nut 28, a spring 46 tending to return the lever 41 towards the nut against an abutment 45.

The other end of the lever 41 is articulated to a rod 47 of a moving core 48 of an electromagnetic pick-off which is received in the casing 43 and which has a double output winding 49 connected via an amplifier 50 to a motor 51 acting via a reducer 52 to rotate to either hand a worm 53 which is axially stationary and on which the casing 43 engages by way of a tapped bore 54. The rotation of the worm 53 is transmitted by a gear train 55 to a double potentiometer 56, one slider 57 of which is connected to the amplifier 35 via the switch 36 while the other slider 58 is connected to the illuminated information table. The double potentiometer performs one revolution for a movement of the feeler through the zone AB corresponding to the area shown on the table.

While the lever 41 does not contact the nut 28, the core 48 is kept raised by the spring 46 and induces in the pick-off secondary winding 49 a voltage causing the motor 51 to rotate to the hand corresponding to movement of the casing 43, and therefore of the lever 41, towards the nut (arrow h in FIG. 1). When the lever touches the nut, the core 48 drops, and when the core 48 comes level with the centre of the winding 49, the induced voltage is zero and the motor stops. Movement of the nut to either hand shifts the nut to the opposite hand, and so the casing and consequently the feeler, must follow the nut until the core 48 is level with the center of the winding 49.

Consequently, the feeler lever 41 is compelled always to follow the nut and enables the position thereof to be determined, such position being converted into adjustment of a voltage at the potentiometer 56 to give, as it were, a repeat feature and enable the position of the nut to be read out.

Between two operationse the feeler lever 41 must be brought to a position in which it does not inhibit rotation of the drum 9; accordingly, a selector or reversing switch 60 (FIG. 7) is provided which is operated by the shaft 25 of the store selector 26 (FIG. 1) and which short-circuits the bottom half 49a of the pick-off winding 49, the resulting imbalance causing the feeler 41 to return to its top end position (FIGS. 1 and 7). In its end position the lever 41 contacts an abutment 61 which acts by way of the core 48 to close a contact 62 which in turn short-circuits the top half 49b of the winding 49 so that the lever 41 stops.

An adjustable stop 63 is provided near the front of the casing 43 on the path of the abutment 45 and can act thereon, to which end the abutment 45 is slidably mounted in the arm 45a of the casing, the action of the abutment 63 on the abutment 45 being such that the lever 41 is raised and stopped approximately in the position B in FIG. 1. This prevents ambiguity from arising at write-in and read-out due to the feeler detecting a nut whose end surface is disposed between B and D—i.e., outside the zone AB.

Disposed in the zone C–A is a contact 64 which a spring 65 (FIG. 1) keeps open and which the casing 43 closes when the feeler passes beyond the limit A in the direction of C, the latter contact maintaining, instead of the sliders, the voltages which would be obtained at the limit position A.

The apparatus just described operates as follows:

When the pinion 3 is in a given position corresponding to a desired adjustment of the coordinates at the centre of the table and it is desired to write-in the instantaneous position of the aircraft, a check is first made to ensure that the write-in knob 39 is correctly pushed in and will rotate the store selector 26 (FIGS. 5 and 6). The selector 26 is pushed to operate the reversing switch 60 and bring the feeler 41 into the inoperative position in which it is disengaged from the drum 9. The selector 26, while continuing to be pressed, is moved to the position (numbered from 1 to 12) corresponding to the pair of nuts whose position it is required to write-in. When the selector is released its spring 26a urges it forwards and the reversing switch 60 returns to its normal position, so that the winding half 49a is cut into circuit again, whereafter the feeler hunts for and finds the nut 28. The write-in knob 39 is then pressed so that the switch 36 closes and the clutch elements 22, 30 engage with one another. The motors 34 then run to one or the other hand until the voltages at the sliders 57 are respectively equal to the voltages of the ordinates of the position to be written-in. Upon voltage equalisation being reached the motors stop, write-in then being complete.

To write-in another point or position, the knob 39 must first be pressed to release the clutched worm, open the contact 36 and allow the store selector to rotate, whereafter the procedure just described is followed.

To read-out a written-in position, the selector is merely brought to the position in which the particular point concerned was written-in. Upon release of the selector the feeler acts as already described to discover the nut, so that the potentiometer 56 receive the voltages corresponding to the coordinates transmitted by the sliders 58 to the table on which the position of the point can be read. Any store can be read continuously even during write-in.

As already mentioned, coordinates changes at the centre of the table can be transmitted to the write-in system. Such coordinates changes are represented by a rotation to either hand of the pinions 3 corresponding to the two N–S and E–W coordinates. During coordinates changes—of course there is no question of write-in during coordination changes—all the worms 13 are braked, and so rotation of the pinions 3 causes all the various nuts to move in the same direction and by the same amounts.

To be able to read-out the written-in position of a point:

(1) The position of the point must at read-out be inside the area bounded by the edges of the table screen i.e., the end surfaces of the nuts must be disposed within the aforesaid limits A.B.;

(2) At least one of the nuts 28 corresponding to the coordinates of the point must not, during any consecutive coordinates changes subsequent to write-in, have contacted the ends of its worm 13, as described with reference to FIG. 4, for the position of the nut on its worm 13 would then not correspond to the algebraic sum of the consecutive coordinates and read-out would be wrong.

I claim:

1. Apparatus for storing data elements comprising a number of nut and worm systems disposed on a common support member which can be moved to selectively bring at least one nut and worm system opposite a station for writing-in and reading-out the stored data element to enable a number of data elements to be placed and maintained in store, the value of the data which it is required to store, means to bring the nut to a geometric position corresponding to the data to be written-in and means for detecting the position of the nut—i.e., to read-out the stored data.

2. Apparatus as set forth in claim 1 which consists of two units each of which has means corresponding to the write-in and read-out of the stored data and wherein the geometric position of said data is represented by two coordinates of a point, and adjusting members common to such two units.

3. Apparatus as set forth in claim 1 wherein the support member is a rotating drum and the nut and worm systems are uniformly distributed axially over the drum periphery.

4. Apparatus as set forth in claim 1 wherein the common support member is a pinion and all the nuts mesh with said pinion to normally prevent the nut from rotating but allow the nuts to move relatively to their respective worms for changing the origins from which the data are recorded.

5. Apparatus as set forth in claim 1 wherein a feeler mechanism is associated with the support member for detecting the position of the nut on its worm and wherein means are provided to limit the action of the feeler to a predetermined range of positions of said nut.

6. Apparatus as set forth in claim 4 wherein each worm is braked on the pinion by a clutch element corresponding to a complementary element at the write-in station.

7. Apparatus as set forth in claim 4 wherein each nut meshes with the pinion by three sets of teeth, the central set of teeth rotating solidly with the nut body, the two end sets being connected thereto by pawl devices operative to opposite hands and abutments are associated with each worm so that at the end of travel, one of the end tooth sets of the nut stays in engagement with the pinion, so that the same is not blocked and the nut can shift in the opposite direction when the direction on the pinion rotation reverses.

8. Apparatus as set forth in claim 4 wherein a feeler mechanism is associated with the drum for detecting the position of the nut on the worm disposed opposite the write-in station.

9. Apparatus as set forth in claim 8 wherein the feeler device controls an electromagnetic pick-off driving a motor which shifts the feeler in dependence upon the shift of the nut so that the feeler is compelled to follow the nut.

10. Apparatus as set forth in claim 9 wherein the shifting of the feeler is coupled with the movement of a potentiometer to enable the position of the nut on the worm to be read out.

11. Apparatus as set forth in claim 9 wherein write-in is performed by an electric motor which drives the clutch element of the write-in station and the motor is controlled by a voltage representing the value of the data to be written-in.

12. Apparatus as set forth in claim 10 wherein the voltage of the potentiometer coupled with the shift of the feeler is also transmitted to the motor of the write-in station so that when the later voltage reaches the same value as the control voltage, the worm-driving motor stops.

References Cited

UNITED STATES PATENTS

| | | | |
|---|---|---|---|
| 976,729 | 11/1910 | Ellett | 172—743 X |
| 3,324,281 | 6/1967 | Morse | 340—172.5 X |

PAUL J. HENLON, *Primary Examiner.*

PAUL R. WOODS, *Assistant Examiner.*

U.S. Cl. X.R.

74—89.15